(12) United States Patent
Patzer

(10) Patent No.: US 7,840,456 B2
(45) Date of Patent: Nov. 23, 2010

(54) SYSTEM AND METHOD FOR CATEGORIZING CREDIT CARD TRANSACTION DATA

(75) Inventor: Aaron Patzer, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 802 days.

(21) Appl. No.: 11/809,272

(22) Filed: May 30, 2007

(65) Prior Publication Data

US 2008/0301042 A1   Dec. 4, 2008

(51) Int. Cl.
G07B 17/00 (2006.01)
G07F 19/00 (2006.01)

(52) U.S. Cl. .......................................... 705/30; 705/26
(58) Field of Classification Search ........................ None
See application file for complete search history.

(56) References Cited

U.S. PATENT DOCUMENTS

| | | | |
|---|---|---|---|
| 6,792,422 B1* | 9/2004 | Stride et al. ........................ 1/1 |
| 2002/0099635 A1* | 7/2002 | Guiragosian ................. 705/35 |
| 2006/0004866 A1* | 1/2006 | Lawrence et al. ......... 707/104.1 |
| 2007/0129987 A1* | 6/2007 | Hauser et al. .................. 705/9 |
| 2007/0011175 A1 | 11/2007 | Langseth et al. |
| 2008/0071587 A1* | 3/2008 | Granucci et al. ............... 705/5 |
| 2008/0195438 A1* | 8/2008 | Manfredi et al. ............... 705/7 |

OTHER PUBLICATIONS

International Search Report, Sep. 9, 2008, 2 pages.
Written Opinion of the International Searching Authority, Sep. 9, 2008, 5 pages.

* cited by examiner

Primary Examiner—F. Zeender
Assistant Examiner—Christopher Buchanan
(74) Attorney, Agent, or Firm—Park, Vaughan, Fleming & Dowler LLP

(57) ABSTRACT

A system and method employs a categorized list of business names to identify a category corresponding to transaction information, such as credit card transaction data.

23 Claims, 7 Drawing Sheets

| TOK 1 | TOK 2 | TOK 3 | TOK 4 | TOK 5 | TOK 6 |
|---|---|---|---|---|---|
| BOBS | SUPREME | COURT | I | N | MAIN |
| BOBS BAKERY, BILLY BOBS | EXTREME SUPREME, SUPREME COURT I | SUPREME COURT I, CITY COURT | ICE CREAM PALACE, SUPREME COURT I | NE PIZZA, FUN-N-SUN, NORA'S | MAIN AVE DENTAL |

| COL 0 | COL 1 | COL 2 | COL 3 | COL 4 | COL 5 |
|---|---|---|---|---|---|
| $A^0C(I_1..._1)$ | $A^0C(I_1..._2)$ | $A^0C(I_1..._3)$ | $A^0C(I_1..._4)$ | $A^0C(I_1..._5)$ | $A^0C(I_1..._6)$ |
| | $A^1C(I_2..._2)$ | $A^1C(I_2..._3)$ | $A^1C(I_2..._4)$ | $A^1C(I_2..._5)$ | $A^1C(I_2..._6)$ |
| | | $A^2C(I_3..._3)$ | $A^2C(I_3..._4)$ | $A^2C(I_3..._5)$ | $A^2C(I_3..._6)$ |
| | | | $A^3C(I_4..._4)$ | $A^3C(I_4..._5)$ | $A^3C(I_4..._6)$ |
| | | | | $A^4C(I_5..._5)$ | $A^4C(I_5..._6)$ |
| | | | | | $A^5C(I_6..._6)$ |

ROW 0, ROW 1, ... ROW 5

MATRIX 440

*FIG. 4A*

| TOK 1 | TOK 2 | TOK 3 | TOK 4 | TOK 5 | TOK 6 |
|---|---|---|---|---|---|
| BOBS | SUPREME | COURT | I | N | MAIN |

| BOBS BAKERY, BILLY BOBS | EXTREME SUPREME , SUPREME COURT I | SUPREME COURT I, CITY COURT | ICE CREAM PALACE, SUPREME COURT I | NE PIZZA, FUN-N-SUN, NORA'S | MAIN AVE DENTAL |
|---|---|---|---|---|---|

| | COL 0 | COL 1 | COL 2 | COL 3 | COL 4 | COL 5 |
|---|---|---|---|---|---|---|
| | 0.5 | 0.0 | - | - | - | - |
| ROW 0 | | $0.75 * 0.5$ | $0.75 * 1.0$ | $0.75 * 1.0$ | 0.0 | - |
| ROW 1 | | | $0.75^2 * 0.5$ | $0.75^2 * 1.0$ | 0.0 | - |
| . | | | | $0.75^3 * 0.5$ | 0.0 | - |
| . | | | | | $0.75^4 * .33$ | 0.0 |
| ROW 5 | | | | | | $0.75^5 * 1.0$ |

MATRIX 440

FIG. 4B

SYSTEM AND METHOD FOR CATEGORIZING CREDIT CARD TRANSACTION DATA

FIELD OF THE INVENTION

The present invention is related to computer software and more specifically to computer software for financial analysis.

BACKGROUND OF THE INVENTION

Conventional computer programs, such as the conventional MONEY product commercially available from MICROSOFT Corporation, and the conventional QUICKEN product commercially available from INTUIT corporation, allow a user to identify spending patterns and perform other operations by tracking the amount of money the user spends in various categories.

To categorize the amount of money spent, the user can enter an amount of each transaction that user made, and assign a category to the transaction. For example, if the user purchases gasoline, the user can enter the amount, and assign the category "automobile". At the end of the month, the user can use the categorized transaction data to get a summary statement that shows, for example, the total of all transactions made in that month that were assigned to the automobile category.

There may be a large number of such categories, and there may be a hierarchy of such categories. For example, the automobile category may be further divided into "gasoline" and "maintenance" categories. The hierarchical nature of the categories allows different levels of granularity in the reporting, with reports available that show any spending related to automobiles, or spending just on gasoline.

In addition to the large number of categories, there may be a large number of transactions for the user to enter. For example, a typical credit card statement may have dozens of transactions, making the data entry process time-consuming and cumbersome. Furthermore, the user may have no idea what category to assign to a transaction, because the user may have forgotten the precise nature of the transaction, or may not recall the merchant's name, or the merchant's name on the credit card statement may be different from the name of the store at which the transaction was made.

To solve these problems with credit cards, some financial institutions allow users to download the transaction data from their credit cards. This helps speed the process of entering the amounts, and can help prevent errors, but it does not solve the categorization issues discussed above. To help solve these issues, the programs described above attempt to categorize the transactions using algorithms that are unknown, but not very effective, as neither of the above products appears to provide accurate categorization a majority of the time. One hundred percent accurate categorization by such programs isn't necessary because the user can categorize the remaining transactions, but the low level of automation provided by existing application programs is not much better than not automatically categorizing the transactions at all.

What is needed is a system and method that can accurately categorize transaction data.

SUMMARY OF INVENTION

A system and method categorizes transaction data from credit cards and other sources. The system and method attempts to locate a state code in the transaction data, starting at the end of the transaction data and working backwards. If a state code is found, the state may be used to narrow the search space used subsequently to categorize the transaction. Working backwards from the state code (or from the end of the transaction data, if no state code is found), an attempt is made to identify a city name in the transaction data, narrowing the search space used to categorize the transaction to cities in the state using any state code identified. Matches may be considered to occur if the word or words in a city name match the word or words in the transaction data, if the first letters in a city name are the same as the letters in a word of the transaction data, or if the letters in the transaction data occur in the same order as the letters in the word of the city name, indicating an abbreviation. If the city name matches to more than one city, one of the cities matched may be selected using the size of the city, either in population or area; proximity to a home city identified by the user; both of these; or proximity to a somewhat close in time transaction before or after the transaction at issue.

Once a city name and optionally a state name have been identified, the city and, optionally, the state, are used to limit the search for the business name, in the transaction data that precedes any city or state located, to those businesses listed in a business listings database that categorizes the listings in a hierarchical arrangement, such as a yellow pages database. Businesses in such a database, restricted to any city and/or state identified as described herein and above, that have at least some words that also "match" (using the forms of matching described above) are identified. The "matching" words in each business name are assigned a position in a matrix that corresponds to the transaction data. A relevance score is assigned to each occupied row in the matrix, and a category confidence score is assigned to each occupied entry of the matrix.

The category confidence score of entry $(i, j)$ in the matrix is assigned by finding all matching businesses which "match" every token from column $j$ through column $i$, and identifying the categories of those businesses, where $j>i$. The category corresponding to the greatest number of businesses is divided by the total number of such businesses (or 1 is divided by the number of categories represented) to identify the category confidence score.

For each category confidence score, that score is multiplied by the relevance score to produce an entry score, and the entry having the highest score is selected. The category representing businesses corresponding to that entry is selected as the category of the transaction.

Ties may be broken in favor of the entry with the largest difference between $i$ and $j$. If a single entry is identified in this manner, the category representing businesses corresponding to that entry is associated with the transaction data.

In the event that the selected category corresponds to a single business, other information associated with that business in the business listings database may be associated with the transaction. Such other information may include the name, address, phone, fax number, e-mail address, web site, or owner name.

If ties remain, the categories in the business listings of businesses corresponding to the tied entries are reviewed to determine whether the percentage for any such category exceeds a threshold percentage, such as fifty percent, of all the categories of the businesses represented (each "matching" business is counted separately, even if it has the same category as another matched business—that category would be counted once for each business assigned to that category). If the category representing the greatest number of businesses corresponding to the tied entries exceeds the threshold percentage of categories corresponding to the tied entries, that category is associated with the transaction. If not, the hierarchy of categories for the businesses corresponding to the tied entries is traversed to identify the lowest level category (nearest to the leaf nodes) from which the categories of a majority of such businesses are assigned. That category is then assigned to the transaction data.

BRIEF DESCRIPTION OF THE DRAWINGS

FIG. 4A is an illustration of transaction data, "matching" business names, and a blank matrix according to one embodiment of the present invention. FIG. 4B is an illustration of the transaction data and matching business names, and the completed matrix according to one embodiment of the present invention.

DETAILED DESCRIPTION OF A PREFERRED EMBODIMENT

Figure 1:
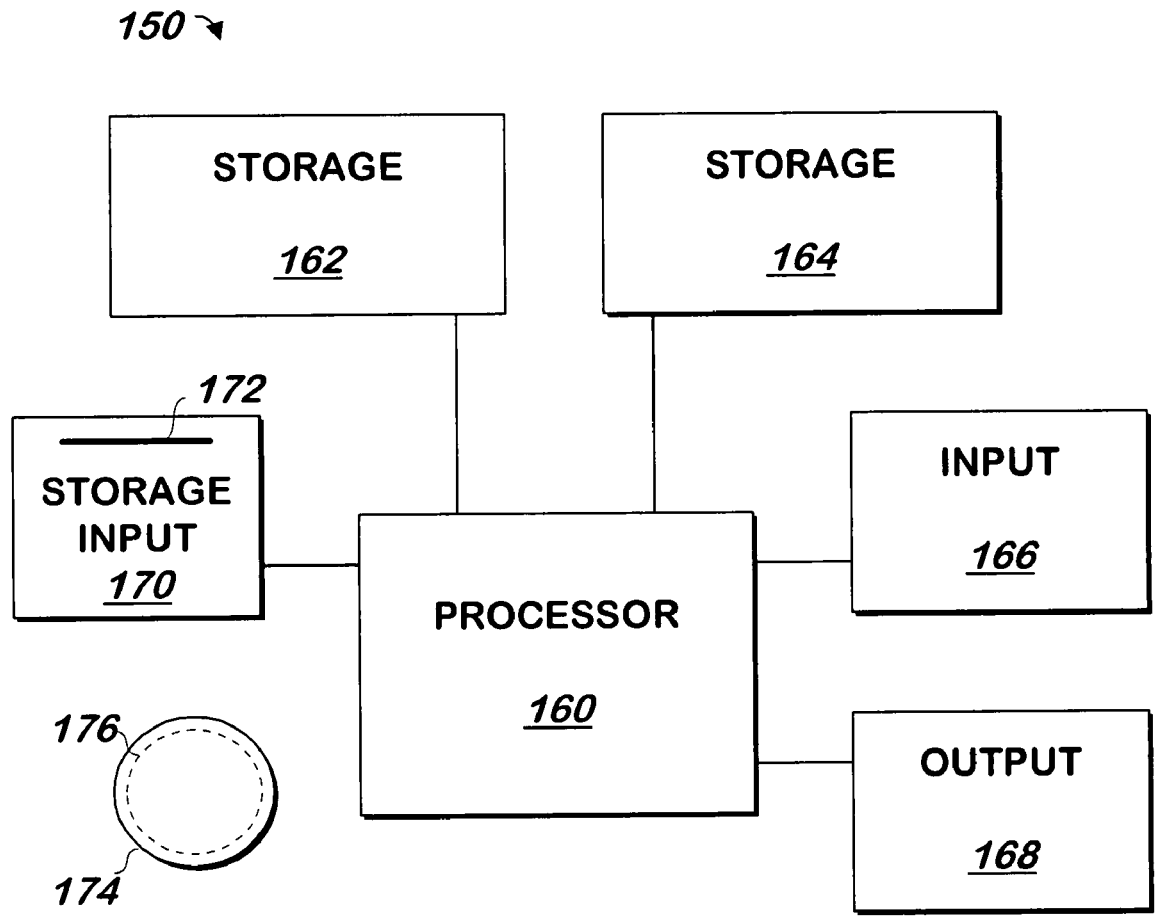
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2A:
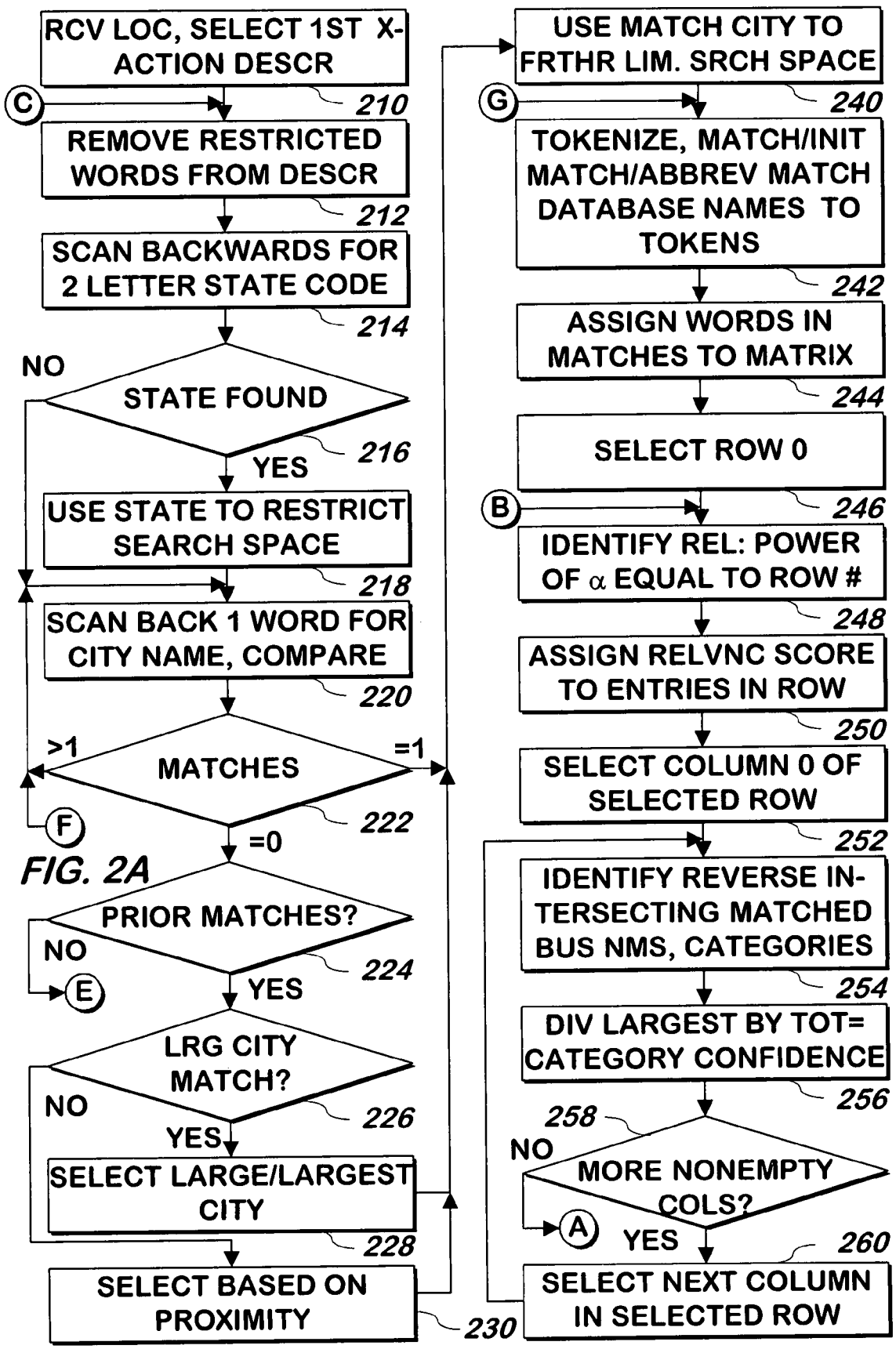
FIGS. 2A, 2B, and 3 are a flowchart illustrating a method of categorizing transactions according to one embodiment of the present invention.
Figure 2B:
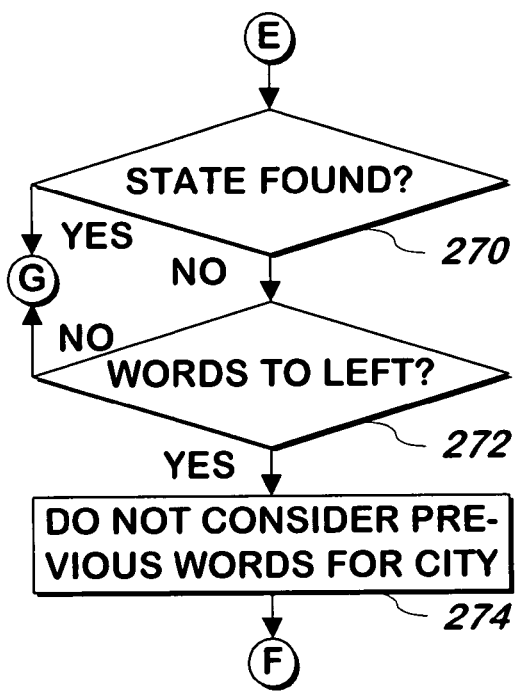
Figure 3:
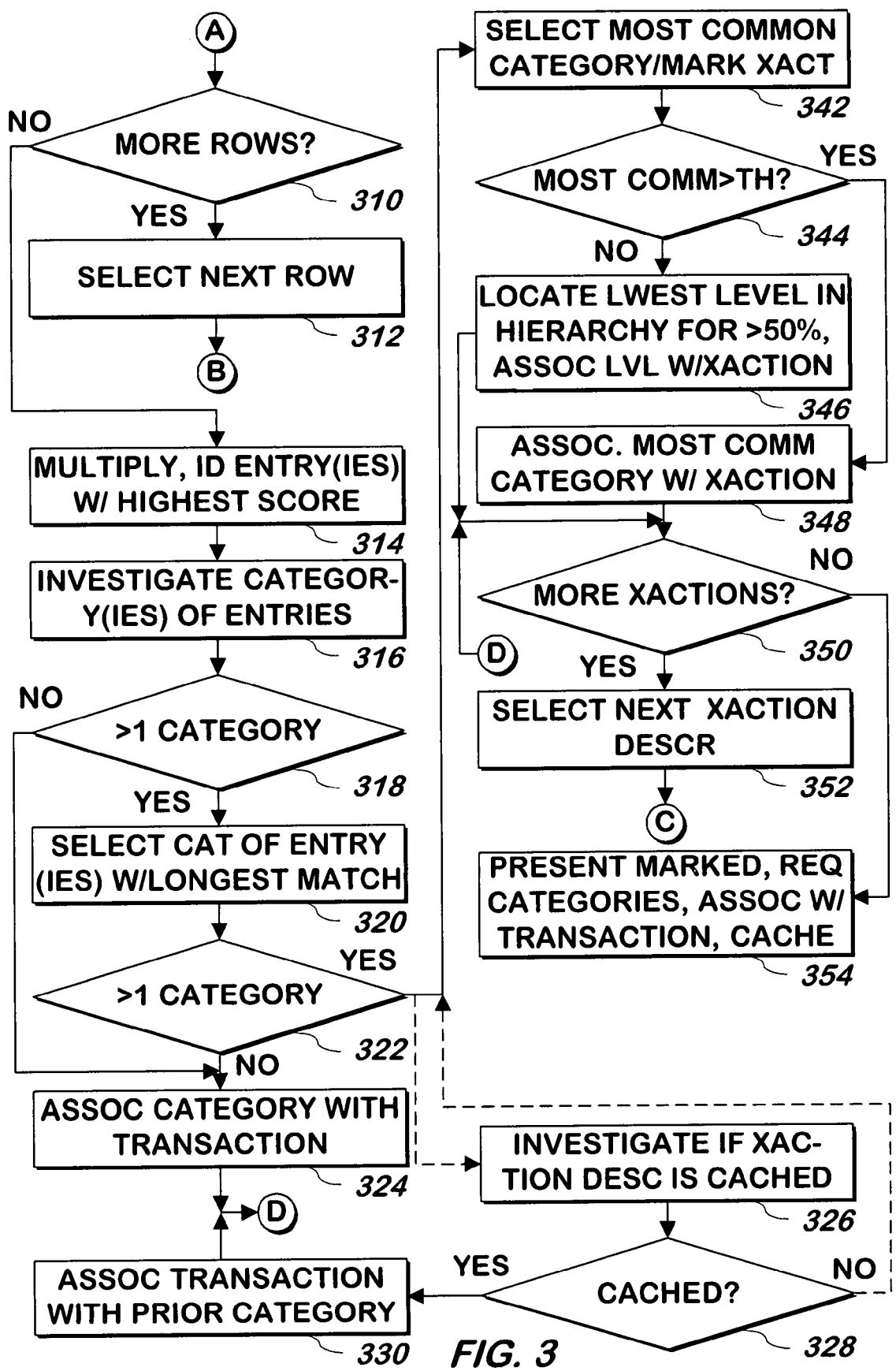

FIGS. 2A, 2B, and 3 are a flowchart illustrating a method of categorizing transactions according to one embodiment of the present invention. Referring now to FIGS. 2A, 2B, and 3, a user's home location is optionally received and a first transaction description is selected 210. In one embodiment, the home location is a city and state in which the user resides. In one embodiment, there may be received from the user as part of step 210 any number of home locations, which may be locations in which the use expects to spend a significant amount of time, such as the city and state of each of a primary residence, a vacation home, and an office.

Restricted words are removed 212 from the transaction description received in step 210. In one embodiment, restricted words include "card", "crd", "check", "checkcard", "credit", "debit", "from", "loc", "merchant", "payment", "purchase", and any word containing or being three or more capital X's. As described herein, a word is any consecutive sequence of characters between any delimiter, such as a space, or the start or end of the transaction description. Step 212 may include tokenizing the words of the transaction description, each token containing a sequence of letters delimited by one or more consecutive spaces, or the beginning or end of the transaction description.

The words or tokens are scanned from the last word towards the first word to attempt to match any such word or token with a two letter state code or other location identifer 214. In one embodiment, the state codes are regular U.S. postal codes. Other types of codes, such as country codes, may be used in place of the state code in step 214.

If the state is found 216, that state is used to restrict the search space as described herein 218, and the method continues at step 220. Otherwise 216, the method continues at step 220.

At step 220, starting from the location of the state code if that state code was found, or starting from the last word or token in the transaction description if no state code was found, the words or tokens in the description are scanned backwards one word or token for a city name. To identify a city name, the word or token starting from the location described above is compared to a database of city names. In one embodiment, the search through the database of city names to attempt to locate a matching city name is limited to those city names of any state that may have been found in step 214.

If no matches are found 222, and no prior matches were found as described in more detail herein and below, the method continues at step 270 of FIG. 2B. At step 270, if a state was identified, the method continues at step 242 of FIG. 2A. Otherwise, if at step 214 no state was found 270, and if any words or tokens remain in the transaction description 272, the scanned word or token is removed from consideration in the attempt to identify a city name 274, and the method continues at step 220 using the next last word or token. If no words or tokens remain 272, the method continues at step 242. This allows matching on a city name "Rochelle" to continue in an attempt to match to, e.g., "New Rochelle". The word or token "Rochelle" would be the prior match when the prior token is added in an attempt to match to "New Rochelle".

If there is exactly one match with the word or words, or token or tokens, scanned for the city name 222, the method continues at step 240. If there are more than one matches for a city name using the word(s)/token(s) scanned as a city name 222, another word or token is scanned backwards and that word or token is added to any words or tokens already scanned (in the same order as those words appear in the transaction data, with a single space between them), and an attempt is made to locate a city name that matches the words or tokens so identified 220.

If there are zero matches 222, but there were one or more prior matches before an additional word or token was scanned backwards 224, and several matches had occurred until the addition of the most recently scanned word, the most recently scanned word is discarded and the word or words previously scanned as described herein and above are used to identify one unique city from the several cities that may match. In one embodiment, to break any tie, either the proximity of the various cities that match may be compared with the one or more home locations received in step 210 to identify a match with the nearest one, or the size and population or area of the city may be used to identify a match. In one embodiment both proximity and size of the city may be used to identify a match, with a trade-off being made for each one. In one embodiment, if a city with a threshold population or size (or another metric) is one of the cities that match 226, the largest of those cities is selected 228 and otherwise 226, the nearest city to any of the locations received in step 210 above is selected 230. In both cases, the method continues at step 240.

In one embodiment, instead of using proximity to one of the locations received as described herein and above, if a transaction has a date and time that is within a threshold amount of time of another transaction for which the city was uniquely identified, and if any of the matched cities are within a threshold distance of such an identified city, that city (or the largest of such cities) may be used to break the tie and uniquely identify a single city from those that matched. Transactions that cannot be identified on the basis of prior transactions or home locations can be held and processed after subsequent transactions are processed. In these embodiments, the transactions received include a date, time or both. In one embodiment, the threshold distance from the prior transactions may vary as a function of the difference in time or date of the selected transaction from a nearby in time transaction, with the distance growing as the difference in date or time gets larger.

At step 240, any matched city identified is used to further limit the search space for company names as described herein and the method continues at step 242. If at step 224, there were no prior matches, then a city name cannot be located, and the method continues at step 242.

At step 242, the remaining words or tokens before (eg. to the left of) any city name, or if no such city name was found, before any state code, or if no such state code was found, before the end of all words in the transaction description, are tokenized if they were not already tokenized, and such tokens are referred to as the "remaining tokens". Also, as part of step 242, an attempt is made to match the remaining tokens with a database of names of businesses, such as may be found in an electronic Yellow Pages, with the search space limited to those businesses in any state or city and state identified for that transaction as described herein.

In one embodiment, a match occurs if any words in the business name are "matched", as described herein and below, with any of the remaining tokens in the same order as the remaining tokens. Thus, in this embodiment, the business name "Harry's Smoke Shop On Main" is considered to match the remaining tokens "Extra Smoke Main Extra". There may be any number of matches made in this manner, with each match using any or all of the "remaining tokens", with each match occurring independently of the others, in that tokens that may match one business name can be used to match one or more other business names as well.

In another embodiment, for a business name to match the tokens, the words in the business name will match tokens without skipping any tokens, except zero or more at the beginning, the end, or both. Thus, in this embodiment, "Harry's Smoke Shop On Main" is considered not to match the remaining tokens "Extra Smoke Emporium Main Extra" because the token "Emporium" is unmatched between the matched tokens "Smoke" and "Main". However, the business name "Harry's Smoke Emporium On Main" would match such remaining tokens ("Extra Smoke Main Extra"), in spite of the fact that the words "Harry's" and "On" in the business name are not matched to any remaining tokens, and the first matching remaining token is not the very first remaining token.

Additionally or alternatively, in one embodiment, matches of words in the business names of the database may occur with each remaining token using some of the letters in the words, without requiring matches to match all of the letters in the words, provided that the letters in the word occur in the same order as they do in the remaining token. In one embodiment, in addition to the preceding rule or in place of it, matches may occur if the first several letters in a word match a remaining token. Thus, in this embodiment, the tokens "Smk Shp" would be match the words in the business name "Smoke" and "Shop", and/or the tokens "Smo Sho" would match words in the business name "Smoke" and "Shop", respectively.

If at least one remaining token is matched to a business name or name, each of the words in each matched business name or names are assigned to an entry in a matrix 244. (In one embodiment, if no remaining tokens are matched to any business name, the transaction is marked for manual categorization.) The matrix consists of rows and columns, with each column corresponding to a remaining token, as shown in FIG. 4A. The entry in the matrix to which the word is assigned has a column corresponding to the remaining token that matched that word, and a row corresponding to the first word in the business name to which any of the remaining tokens matched. Thus, using the example shown in FIG. 4 where the business name "Harry's Smoke Shop On Main" is considered to match the tokens "Extra Smoke Main Extra", the word "Main" in the business name is assigned to the matrix entry in the first row and the second column, because the word "Main" matches to token 2, and the first matching word in the business name ("Smoke") matches to token 1. It is noted that multiple words, e.g. from different business names, may be assigned to the same entry in the matrix. It is also noted that in one embodiment the rows and columns are numbered beginning from 0, while the tokens are numbered beginning from 1, so the matrix entry at the first row and the second column might be identified as entry (0,1).

To make such assignments, the first row, e.g. row 0, is selected 246, and a relevance score, which in one embodiment is Alpha raised to a power equal to the row number, is identified 248 for, and assigned 250 to, all entries in that row. The relevance score serves to depreciate the value of the row, with lower rows having a lower value. In one embodiment, Alpha is 0.75, though other values less than 1 may be used.

The matrix entry at the first column in the selected row is selected 252, and reverse intersecting matched business names for the selected entry are identified 254. A reverse intersecting matched business name for the entry at row i, column j, is one of the matched business names that includes words that match each of the remaining tokens corresponding to columns j through i, inclusive. To be a reverse intersecting matched business name, such a business name need not match any remaining tokens before the remaining token corresponding to column i or after the token corresponding to column j, though if it did, it would still be a reverse intersecting matched business name for the entry at row i, column j. The categories to which these business names are assigned are also identified.

Matching and assignment to the matrix may proceed by, starting with the right most token, selecting that token, locating all potential matches, and assigning any matching business name to the matrix based on the left most token that also matches.

A category confidence score is assigned 256 to the selected entry, using the categories corresponding to any reverse intersecting matched business names as identified in step 252. (In one embodiment, if no reverse intersecting matched business names are found for the selected row and column, a category confidence score of zero is assigned, and the method proceeds at step 258.) To assign the category confidence score, in one embodiment, 1 is divided by the total number of categories assigned to all the reverse intersecting matched businesses at the selected entry. In another embodiment, the number of reverse intersecting matched business names at the selected entry corresponding to each category is tallied, and the category with the largest tally is divided by the total number of such businesses. The category confidence score is associated with the selected matrix entry as part of step 256.

If the entry in the next column in the selected row is associated with a word in a matched business name 258, the entry in the next column in the selected row is selected 260, and the method continues at step 254 using the newly selected entry. Otherwise 258, the method continues at step 310 of FIG. 3. At step 310, if there are more rows having entries to which words in business names are matched as described herein and above, the next such row is selected 312, and the method continues at step 248 of FIG. 2A using the newly selected row.

Otherwise, if there are no more rows having entries to which words in business names are matched as described herein and above 310, the category confidence score of each entry, calculated as described herein and above, is multiplied by the relevance score of the row corresponding to that entry, and the entry or entries with the highest resulting scores are identified 314.

The category or categories associated with the entry or entries identified in step 314 are investigated 316. A category is associated with an entry if a business name that was reverse intersecting matched for the entry as described herein and above is associated with that category.

If, at step 316, there is more than one such category 318, the one or more entries with the longest matches of the entry or entries identified in step 314 are identified, and the category or categories associated with such entries are selected 320. In one embodiment, the entries with the longest matches are those having the highest difference between i and j, and there may be several of these entries. If at step 320 more than one category is selected 322, in one embodiment, the method continues at step 342.

In another embodiment, if at step 320 more than one category is selected 322, the description of the transaction is compared with a circular buffer (e.g. a cache) of transaction descriptions and categories for the same user that were manually categorized 326, for example in step 354 of a previous iteration of the method. If the description is in the cache 328, the transaction is associated with the category previously assigned to the transaction with the matching description 330, and the method continues at step 350. If the transaction is not in the cache 328, the method continues at step 342.

If at step 318 or 322 a single category is identified, that category is associated with the transaction 324, and the method continues at step 350.

At step 342, the category to which the greatest number of reverse intersecting matched business names correspond is selected from among the categories selected at step 320. In one embodiment, step 342 includes marking the transaction for optional manual categorization. If the number of reverse intersecting matched business names corresponding to the selected category, expressed as a percentage of the total number of reverse intersecting matched business names associated with the entry or entries identified in step 320, exceeds a threshold percentage 344, the selected category is associated with the transaction 348, and the method continues at step 350. In one embodiment, the threshold percentage is fifty percent.

Otherwise 344, the hierarchy of categories is traversed to locate 346 the lowest level of the hierarchy, the lowest level being the level nearest the leaf nodes of the hierarchy, for which the number of reverse intersecting matched business names corresponding to categories that descend from that level of the hierarchy exceeds the threshold percentage (such as fifty percent) of the total number of reverse intersecting matched business names associated with the entry or entries identified in step 320. The category at that lowest level is associated with the transaction. The method continues at step 350.

At step 350, if there are more transactions, the next transaction description is selected 352, and the method continues at step 212 of FIG. 2A. Otherwise, if there are no more transactions 350, the transactions marked in step 342 are presented to the user, categories corresponding to those transactions are requested and received from the user and associated with the transaction, and the description and category are saved in the cache 354.

System

Figure 6:
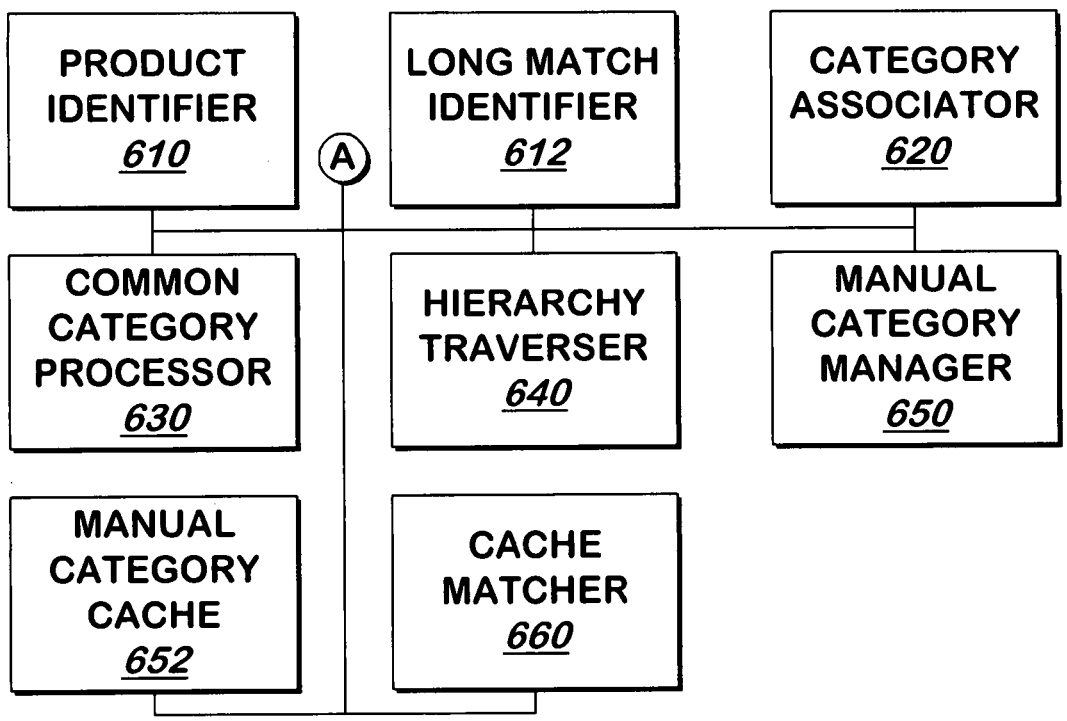
FIGS. 5 and 6 are a block schematic diagram of a system for categorizing transactions according to one embodiment of the present invention.
Figure 5:
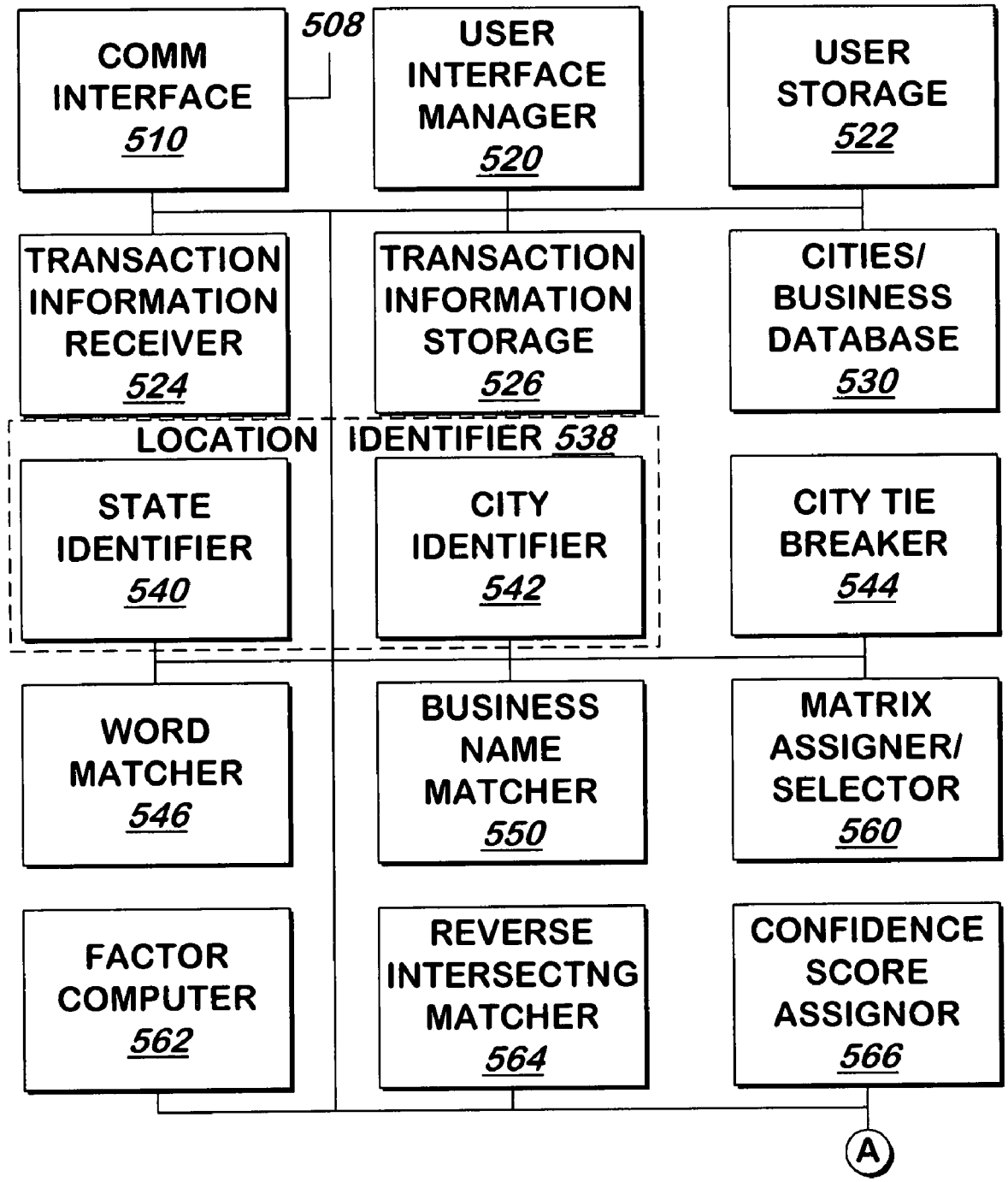

FIGS. 5 and 6 are a block schematic diagram of a system for categorizing transactions according to one embodiment of the present invention. Referring now to FIGS. 5 and 6, at any time, a user may request to use the system, for example by using a conventional web browser to request a URL associated with the system. User interface manager 520 receives the request via communication interface 510. In one embodiment, communication interface 510 includes a conventional communication interface that supports TCP/IP or other conventional communication protocols, and input/output 508 of communication interface 510 is coupled to a network such as the Internet or a local area network or both. In one embodiment, all communication between the user and the system occurs via input/output 508 of communication interface 510, and also via a web browser or similar application hosted by the user's conventional computer system (not shown).

When user interface manager 520 receives the request, user interface manager 520 provides a user interface to the user for logging on to the system, or if the user is not yet registered, for providing registration information. In one embodiment, registration information includes a unique username and a password, either or both of which may be chosen by the user or assigned by user interface manager 520, optional credit card account numbers and other credit card information, and optionally one or more home locations, which may e.g. be a city and state in which the user lives or works. User interface manager 520 stores the registration information in user storage 522.

When the user has logged on using the registration information, user interface manager 520 provides a user interface allowing the user to supply transaction information. The transaction information may for example be in the form of one or more files generated by the user's bank or credit card company, and the user may supply the files directly, or may supply an indication of the location of the files, or may for example copy and paste information received from a bank or credit card statement, or from another source, into the user interface. User interface manager 520 provides the transaction information, or the indication of the location of the transaction information, along with an identifier of the user, to transaction information receiver 524. In one embodiment transaction information includes a date and time, an amount, and additional information referred to herein as the transaction description.

When transaction information receiver 524 receives the transaction information or the indication of the location of the transaction information, transaction information receiver 524 retrieves the information if necessary and stores it in transaction information storage 526. Transaction information receiver 524 parses the transaction information and assigns a unique identifier to each transaction. Transaction information receiver 524 also tokenizes the words in each transaction description. As described herein and above, each token contains a sequence of letters delimited by one or more consecutive spaces, or the beginning or end of the transaction description. Transaction information receiver 524 does not tokenize restricted words. A list of restricted words may for example be received from a system administrator and internally stored by transaction information receiver 524. As described herein and above, in one embodiment, restricted words include "card", "crd", "check", "checkcard", "credit", "debit", "from", "loc", "merchant", "payment", "purchase", and any word containing or being three or more capital X's.

Transaction information receiver 524 creates a doubly linked list of the tokens for each transaction, and stores the lists in transaction information storage 526. In one embodiment, transaction information storage 526 includes a conventional database. Transaction information receiver 524 also creates a transaction record for each transaction, including the transaction identifier, pointers to the first and last token in the doubly linked list of tokens for that transaction, the date and time of the transaction, and the user identifier, and stores the transaction records in transaction information storage 526. Transaction information receiver 524 may receive additional transaction information from financial services organizations, such as banks, credit unions, and credit card processors. Transaction information receiver 524 matches the transaction information to the user identifier to which the transaction corresponds, for example by matching an account number and financial institution, tokenizes the description and stores the lists in transaction storage 526 and creates and stores in transaction information storage 526 the transaction record, and may include in the transaction record the account number and identifier of the financial institution in the account record. Transaction information receiver 524 selects the first of the newly stored transaction records, and provides a pointer to that transaction record to state identifier 540.

When state identifier 540 receives the pointer, state identifier 540 attempts to identify a state code for the transaction. To identify the state code, state identifier 540 locates the list of tokens for that transaction using the transaction record, and, starting with the last token in the list and proceeding back to the first token until a match is found, attempts to match each token to a two letter state code (e.g. NY, CA, etc.). Other types of codes for locations, such as country codes, may be used in place of the state code in other embodiments. If state identifier 540 matches the token to a state code, state identifier 540 adds that state code to the transaction record for that transaction, along with an indication of which token or tokens matched the state code or other location code. When state identifier 540 has added this information to the transaction record, or when state identifier 540 has reached the first token without finding a state code, state identifier 540 provides the pointer to the transaction record to city identifier 542.

When city identifier 542 receives the pointer, city identifier 542 attempts to identify a city for the transaction. To identify the city, city identifier 542 locates the list of tokens for the transaction using the transaction record, and attempts to match the tokens in the list to names of cities starting with the token prior to any token containing the state or other location code. In one embodiment, city identifier 542 compares the tokens to a list of city names stored in cities/business database 530, which may for example be received from a system administrator. In one embodiment, cities/business database 530 includes a conventional database that describes cities for each state, and business names assigned to a hierarchy of categories. Other information about the businesses corresponding to the business names, such as that described above, may also be associated with each of the business names in cities/business database. The hierarchy of categories may also be a part of cities/business database 530.

State identifier 540 and/or city identifier 542 can be considered to be a location identifier 538, which identifies a location corresponding to the transaction. The location may include a city and state, though the state may be any geographic area that encompasses more than one city, such as a county, state, region, country, or continent.

In one embodiment, cities/business database 530 also includes names of common abbreviations for cities, such as "L.A." for Los Angeles. In another embodiment, as described herein and above, city identifier 542 considers a token to match a city name as long as every letter in the token is contained in the city name, in the same order, although any number of additional letters may also be contained in the city name. In another embodiment, a token is considered to match a city name as long as the entire token appears in the city name, in the same order and with no additional letters, and as long as no characters other than a space appear before or after that token in the city name. Therefore, the token "Louis" would be considered to match the city name "St. Louis" and also "East St. Louis", but not the city name "Louisville". In another embodiment, the token would be considered to match all three city names.

As described herein and above, if there is more than one city name that matches a given token, in one embodiment city identifier 542 adds the token listed before the matching token, and attempts to identify a city name that matches the tokens taken together, with a single space between them. If only one city name is found matching both tokens, city identifier 542 determines that to be the matching city name. City identifier 542 continues to add tokens until only one, or zero, matches are found. If zero matches are found, city identifier 542 determines that the previous matches found are the matching city names.

If a state code is included in the transaction record, city identifier 542 starts the matching process using the token before the token identified as matching a state code, and compares that token only to names of cities that are located in the state identified in the transaction record. In this embodiment, the list of city names stored in cities/business database 530 also indicates the state in which each city is located. If city identifier 542 finds no city names matching that token, city identifier 542 provides the pointer to that transaction record to business name matcher 550, which proceeds as described herein and below.

If no state code is included in the transaction record, city identifier 542 starts the matching process from the last token. The matching process is the same as described herein and above, with the difference that if the last token does not match any city names, city identifier 542 selects the next-to-last token and repeats the process of attempting to find a matching city name. City identifier 542 proceeds backwards through the list of tokens until a matching city name is found, or until city identifier 542 determines that multiple matching city names exist as described herein and above, or until city identifier 542 determines that none of the tokens match a city name.

If city identifier 542 identifies a single matching city name for the transaction, city identifier 542 adds the city name to the transaction record in transaction information storage 526, along with an indication of which token or tokens matched that city name. If no state code is included in the transaction record, in one embodiment city identifier 542 also adds the state code of the state in which the matching city is located, if a unique match can be identified, which, in one embodiment, may be delayed until ties are broken as described below. When city identifier 542 has added this information to the transaction record, or if city identifier 542 determines that none of the tokens match a city name, city identifier 542 provides the pointer to that transaction record to business name matcher 550, which proceeds as described herein and below.

Otherwise, if city identifier 542 finds more than one matching city name, city identifier 542 provides the pointer to that transaction record and all matching city names, associated with identifiers of the tokens found to match those names, to city tie breaker 544.

When city tie breaker 544 receives the pointer, matching city names, and associated information as described herein and above, city tie breaker 544 identifies a best matching city from among the matching cities. In one embodiment, as described herein and above, to identify the best matching city, city tie breaker 544 determines whether any of the matching cities are above a threshold population, and if so selects the largest of the cities. In this embodiment, city populations are stored in cities/business database 530 associated with the city names, and city tie breaker 544 uses this information to make the determination. Additionally or alternatively, city tie breaker 544 may use the user identifier included in the transaction record to find that user's home location(s) in user storage 522, and may select the city that is closest to such a home location. In this embodiment, city/business database 530 may for example include the longitude and latitude coordinates of cities, and city tie breaker 544 may use this information to determine proximity.

In one embodiment, city tie breaker 544 may weigh both population and proximity in choosing a city, and/or may weigh other information, such as the location of other transactions occurring within a threshold amount of time from that transaction, as described herein and above. In this embodiment, city tie breaker 544 finds the location of other such transactions by examining the transaction records in transaction information storage 526, and may retain the transaction until the location of other transactions has been determined. City tie breaker 544 may use other techniques for selecting a best match from among the matching city names in other embodiments. When city tie breaker 544 has selected a best match, city tie breaker 544 stores the best matching city name in the transaction record in transaction information storage 526, associated with the identifiers of the tokens found to match that name. If no state code is included in the transaction record, in one embodiment city tie breaker 544 also includes the state code of the state in which the city is located. City tie breaker 544 provides the pointer to the transaction record to business name matcher 550.

When business name matcher 550 receives the transaction record pointer from city tie breaker 544, or from city identifier 542 as described herein and above, business name matcher 550 locates the list of tokens for the transaction using the transaction record, and uses the information stored in the transaction record to find the "remaining tokens". As described herein and above, the remaining tokens are those tokens not matched to a city name or a state code or other form of location. Business name matcher 550 provides each remaining token, along with any city and state identified, to word matcher 546. When word matcher 546 receives the remaining tokens and any city and state identified, word matcher 546 compares the tokens to a list of business names, such as an electronic Yellow Pages database, which in one embodiment is received from a system administrator and stored in city/business database 530. In one embodiment, city/business database 530 includes listings of businesses by city and state. If a city and state were identified, word matcher 546 compares the tokens only to the names of businesses located in that city and state. If a state or other location is identified, word matcher 546 compares the tokens only to the names of businesses located in that state or other location.

The criteria used to determine whether one or more tokens match a given business name may be different in different embodiments, and may include any or all of the criteria described herein and above, such as matching any of the remaining tokens to business names that feature any, but not necessarily all, of those tokens in the same order (i.e. matching the tokens "Extra Smoke Main Extra" to the business name "Harry's Smoke Shop On Main"); matching the remaining tokens to business names that feature all the remaining tokens in the same order, except zero or more at the beginning, the end, or both (i.e. matching the tokens "Extra Smoke Emporium Main Extra" to the business name "Harry's Smoke Emporium On Main"); and/or matching the remaining tokens to business names with words that contain the letters of the token in the same order as they are given in the token, along with any number of additional letters (i.e. matching "Smk Shp" to "Harry's Smoke Shop").

Word matcher 546 may determine that any number of business names match the remaining tokens. If no matching business names are found, and if a city and state were identified, in one embodiment word matcher 546 also compares the tokens to businesses located in the identified state. If no matching business names are found, in one embodiment word matcher 546 compares the tokens to all business names, and/or repeats the matching process with progressively less stringent matching criteria until at least one match is found.

When word matcher 546 has compared the tokens to the business names, word matcher 546 associates each matching business name with identifiers of the token or tokens that matched that business name. In one embodiment, cities/business database 530 includes the category to which each business name corresponds, and word matcher 546 also associates each matching business name with an identifier of its corresponding category, as well as some or all of the other information associated with that business in cities/business database 530. Word matcher 546 provides all matching business names and associated information to business name matcher 550.

When business name matcher 550 receives the matching business names and associated token and category identifiers, business name matcher 550 adds this information to the transaction record in transaction information storage 526. Business name matcher 550 also provides the pointer to the transaction record to matrix assigner/selector 560.

When matrix assigner/selector 560 receives the pointer, matrix assigner/selector 560 assigns each matching business name to one of the entries in the matrix described above. As described herein and above, in one embodiment, the entry in the matrix to which each word is assigned has a column corresponding to the ordinal position of the right most remaining token that matched that word (that is, the first column corresponds to the first remaining token and the second column corresponds to the second remaining token, and so on), and a row corresponding to the ordinal position of the left most token to which any of the words in the business name matched (that is, the first row corresponds to first token, the second row corresponds to second token, and so on). Matrix assigner/selector 560 stores an identifier of the matrix entry to which each matching business name corresponds, associated with that name, in transaction information storage 526. Matrix assigner/selector 560 also selects the first row in the matrix, and provides an identifier of that row to factor computer 562. In one embodiment, the first row is row 0, the second row is row 1, etc.

When factor computer 562 receives the row identifier, factor computer 562 identifies a relevance score that, in one embodiment, is equal to Alpha raised to the power of the row number, although other functions may be used in other embodiments. The value of Alpha, e.g. 0.75, may for instance be received from a system administrator and internally stored by factor computer 562. For example, for row 0, factor computer 562 may determine that the value of 0.75 raised to the power of 0 is 1, and therefore, that the relevance score is 1. Factor computer 562 provides the relevance score to matrix assigner/selector 560.

When matrix assigner/selector 560 receives the relevance score, matrix assigner/selector 560 assigns that relevance score to entries in the row corresponding to the row identifier it provided. When matrix assigner/selector 560 has assigned the relevance score, matrix assigner/selector 560 selects the matrix entry at the first column of the selected row assigned as described above, and provides an identifier of that entry (e.g. 0,0 for an entry at row 0, column 0), along with the pointer to the transaction record, to reverse intersecting matcher 564.

When reverse intersecting matcher 564 receives the entry identifier and pointer, reverse intersecting matcher 564 uses the information in the transaction record to locate the matrix and to identify any reverse intersecting matched business names for that entry. As described herein and above, a reverse intersecting matched business name for the entry at row i, column j, is one of the matched business names that includes words that match each of the remaining tokens corresponding to columns j through i, inclusive. If reverse intersecting matcher 564 does not identify any reverse intersecting matched businesses for the entry, reverse intersecting matcher 564 provides an indication to confidence score assignor 566 that no reverse intersecting matched business names were identified. Otherwise, reverse intersecting matcher 564 provides the reverse intersecting matched business names for the entry, along with their corresponding category identifiers, to confidence score assignor 566.

When confidence score assignor 566 receives the reverse matching business names and corresponding category identifiers, or the indication that no reverse intersecting matched business names were identified, confidence score assignor 566 identifies a category confidence score. As described herein and above, in one embodiment, the category confidence score is 1 divided by the total number of categories corresponding to all the reverse intersecting matched businesses for the selected. In another embodiment, confidence score assignor 566 tallies the number of reverse intersecting matched businesses corresponding to each category, and the category confidence score is the tally of the category with the largest tally, divided by the total number of reverse intersecting matched businesses. In one embodiment, if confidence score assignor 566 receives the indication that no reverse intersecting matched businesses were identified, confidence score assignor 566 determines that the category confidence score is zero. When confidence score assignor 566 has identified the category confidence score, confidence score assignor 566 provides the category confidence score, along with any reverse intersecting matched business names and their associated category identifiers, to matrix assignor/selector 560.

When matrix assignor/selector 560 receives the category confidence score along with any reverse intersecting matched business names and associated category identifiers, matrix assignor/selector 560 assigns that category confidence score to the selected entry in the matrix stored in transaction storage 526. Matrix assignor/selector 560 also stores any reverse intersecting matched business names and associated category identifiers in the transaction record in transaction information storage 526, associated with the identifier of the selected matrix entry.

If any additional entries remain in the selected row, matrix assignor/selector 560 selects the next entry in the selected row, and provides an identifier of that entry, along with the pointer to the transaction record, to reverse intersecting matcher 564. Reverse intersecting matcher 564, confidence score assignor 566, and matrix assignor/selector 560 repeat the process described herein and above of identifying any reverse intersecting matched business names and associated categories, and of assigning a category confidence score to the selected entry, and the process thereafter repeats for each entry in the selected row.

Otherwise, if no additional entries remain in the selected row, matrix assignor/selector 560 selects the next row in the matrix, and provides an identifier of that row to factor computer 562. Factor computer 562 repeats the process described herein and above of identifying a relevance score and providing that relevance score to matrix assignor/selector 560, and matrix assignor/selector 560 assigns the relevance score to all entries in the selected row. Matrix assignor/selector 560 then selects the first entry in the selected row and provides an identifier of that entry, along with the pointer to the transaction record, to reverse intersecting matcher 564. Reverse intersecting matcher 564, confidence score assignor 566, and matrix assignor/selector 560 repeat the process described herein and above of identifying any reverse intersecting matched business names and associated categories, and of assigning a category confidence score to the selected entry, and the process thereafter repeats for each entry in the selected row. If any additional rows were assigned in the matrix, the process repeats for the next row. In this manner, both a relevance score and a category confidence score are assigned to each entry assigned to the matrix, and the transaction record is updated with reverse intersecting matched business names and associated categories for each entry.

When no more rows not already processed are assigned to the matrix, matrix assignor/selector 560 provides the pointer to the transaction record to product identifier 610. When product identifier 610 receives the pointer, product identifier 610 uses the transaction record to locate the entries in the matrix for that transaction. For each entry in the matrix, product identifier 610 multiplies the category confidence score by the relevance score. The resulting score is referred to herein as the entry score. Product identifier 610 identifies the entry with the highest entry score, or if more than one entry is tied for the highest entry score, all such entries. Product identifier 610 also uses the information in the transaction record to determine the number of categories associated with all such entries. In one embodiment, a category is associated with an entry if a reverse intersecting matched business name for that entry is associated with that category.

If there is only one category associated with all the highest-scoring entries (of which, there may only be one), product identifier 610 provides that category identifier to category associator 620, which proceeds as described herein and below. In one embodiment, if there is only one business name associated with all of the entries or all of the high scoring entries, product identifier 610 retrieves from cites/business database 530 other information that may have been provided in the database, such as that described above, and also provides that other information to category associator 620. If there are multiple categories corresponding to a single highest-scoring entry, product identifier 610 provides the identifier of that entry, along with the pointer to the transaction record in transaction information storage 526, to common category processor 630, which proceeds as described herein and below. Otherwise, if there are multiple categories corresponding to multiple entries tied for the highest score, product identifier 610 provides the identifiers of the highest scoring entries, along with the pointer to the transaction record in transaction information storage 526, to long match identifier 612.

When long match identifier 612 receives the identifiers and pointer, long match identifier 612 determines which of the identified entries represents the longest match. In one embodiment, entries are identified by their row and column numbers: that is, the entry at row i and column j is identified as entry (i, j). In this embodiment, the entries with the longest match are those having the highest difference between i and j. Long match identifier 612 uses the information in the transaction record to determine the categories associated with the longest matching entry or entries. If only one category is associated with that entry or those entries, long match identifier 612 provides the identifier of that category, along with the pointer to the transaction record, to category associator 620, which proceeds as described herein and below. Otherwise, long match identifier 612 provides identifiers of the entry or entries with the longest match, along with the pointer to the transaction record in transaction information storage 526, to common category processor 630.

When common category processor 630 receives the entry identifier(s) and pointer, either from long match identifier 612 or from product identifier 610 as described herein and above, common category processor 630 uses the information in the transaction record to locate the original transaction, and in one embodiment, marks that transaction for user confirmation. Common category processor 630 also uses the information in the transaction record to locate the matrix entries corresponding to that transaction; finds the identified entries; finds in the transaction record the reverse intersecting matched business names associated with those entries, and the categories corresponding to those reverse intersecting matched business names; and selects from among those categories the "most common" category or categories. In one embodiment, the most common category is the category to which the greatest number of those reverse intersecting matched business names correspond. If only one such category exists, and if more than a threshold percentage (e.g. fifty percent) of those reverse intersecting matched business names corresponds to that category, common category processor 630 provides the identifier of that category, along with the pointer to the transaction record, to category associator 620, which proceeds as described herein and below.

In one embodiment, if only one such category exists, common category processor 630 determines whether each of the entries corresponds to the same business name. If so, common category processor 630 retrieves any other information associated with that business name in cities/business database 530, and provides it to category associator 620 as well. The other information may be any or all of the information described above, including the business name itself.

Otherwise, if no single category is the most common category, or if the most common category corresponds to fewer than the threshold percent of the reverse intersecting matched business names corresponding to the identified entries, common category processor 630 provides the entry identifier(s), along with the pointer to the transaction record, to hierarchy traverser 640.

When hierarchy traverser 640 receives the entry identifier(s) and the pointer, hierarchy traverser 640 uses the information in the transaction record and a hierarchy of the categories in order to identify the lowest most common category corresponding to more than the threshold percentage of those entries. In one embodiment, the hierarchy of the categories is a description of the relationships between all categories of businesses to which a business name may be associated in cities/business database 530, as well as any parent, grandparent, etc. categories under which such categories are organized. The hierarchy is stored in cities/business database 530.

For example, assume that hierarchy traverser 640 received a pointer to entry (i, j), and that this entry corresponds to the reverse intersecting matched business names "Dan's Used Car World" and "Luxury Car World Wide Imports". "Dan's Used Car World" may for instance correspond to the category "automobiles, used", and "Luxury Car World Wide Imports" may correspond to the category "automobiles, new". In this example, neither category corresponds to more than fifty percent of the reverse intersecting matched business names. Assume, however, that in the hierarchy of categories, both "automobiles, used" and "automobiles, new" fall under the more general, parent category of "automobiles". In this case, hierarchy traverser 640 would traverse the hierarchy and determine that the lowest most common category corresponding to the selected entries is "automobiles".

When hierarchy traverser 640 has identified the lowest most common category, hierarchy traverser 640 provides the identifier of that category, along with the pointer to the transaction record, to category associator 620.

When category associator 620 receives the category identifier and pointer from hierarchy traverser 640, or from product identifier 610, long match identifier 612, common category processor 630, or cache matcher 660 as described herein, category associator 620 uses the information in the transaction record to locate the original transaction in transaction information storage 526, and adds the category identifier to the original transaction information, stored as described above. In one embodiment, category associator 620 also adds the user identifier stored in the transaction record to the original transaction. Other information about the business provided to category associator 620 from product identifier 610 as described above may also be associated with the transaction. If other information is received as described above, category associator 620 adds this information to the original transaction in transaction information storage 526. Category associator 620 also signals transaction information receiver 524.

When so signaled, transaction information receiver 524 selects the next of the recently stored transaction records in transaction information storage 526, and provides a pointer to that transaction record to state identifier 540. The process described herein and above of finding a state and city, finding matching business names and categories, creating and filling a matrix, identifying reverse intersecting matched business names, and using the matrix and the reverse intersecting matched business names to assign a category to the transaction therefore repeats for the transaction corresponding to the newly selected transaction record, at which point category associator 620 again signals transaction information receiver 524, and the process repeats for the next transaction.

When category associator 620 signals transaction information receiver 524, if all the recently stored transaction records have been processed, in one embodiment, transaction information receiver 524 signals manual category manager 650. When so signaled, manual category manager 650 finds any original transactions in transaction information storage 526 that were marked by common category processor 630 as described herein and above.

In another embodiment, rather than transaction information receiver 524 signaling manual category manager 650 when all the transaction records have been processed, user interface manager 520 provides manual category manager 650 with the user identifier when the user logs in, and manual category manager 650 finds any marked original transactions in transaction information storage 526 corresponding to that user.

In both embodiments, when manual category manager 650 has found the marked original transactions, manual category manager 650 provides pointers to these transactions to user interface manager 520, and user interface manager 520 provides a user interface to the user, displaying each transaction along with the category that has been assigned to that transaction. The user interface allows the user to modify the category if it is incorrect or assign one if none is assigned. In one embodiment, for each transaction that the user modifies, user interface manager 520 stores that transaction in manual category cache 652. In one embodiment, manual category cache 652 includes a conventional circular buffer. When the transactions have been displayed to the user, user interface manager 520 unmarks the transactions in transaction information storage 526. For those to which the user assigns a category, user interface manager 520 provides the pointer to the transaction record and the category to category associator 620, which proceeds as described above.

In one embodiment, if product identifier 610 determines that there are multiple categories corresponding to a single highest-scoring entry, rather than providing the identifier of that entry along with the pointer to the transaction record to common category processor 630 as described herein and above, product identifier 610 instead provides the pointer to the transaction record to cache matcher 660.

In this embodiment, when cache matcher 660 receives the pointer, cache matcher 660 uses the information in the transaction record to find the original transaction, and cache matcher 660 compares the transaction description to the descriptions included in any transactions corresponding to the same user and cached in manual category cache 652. If cache matcher 660 finds a matching description, cache matcher 660 finds the category that was assigned by the user to the cached transaction, and provides the identifier of that category along with the pointer to the transaction record to category associator 620. Category associator 620 assigns that category to the original transaction corresponding to the transaction record, as described herein and above.

Otherwise, if cache matcher 660 does not find a matching description, cache matcher 660 provides an indication to product identifier 610 that no match was found. Product identifier 612 provides the identifier of the highest scoring entry and the pointer to the transaction record to common category processor 630, which proceeds as described herein and above.

Similarly, in this embodiment, if long match identifier 612 fails to identify a single category corresponding to the transaction as described herein and above, rather than providing the identifiers of the entry or entries with the longest match and the pointer to the transaction record to common category processor 630 as described herein and above, long match identifier 612 provides the pointer to the transaction record to cache matcher 660, and cache matcher 660 attempts to identify a category that was manually assigned to a matching transaction in manual category cache 652 as described herein and above. If cache matcher 660 finds such a category, cache matcher 660 provides the category identifier and pointer to category associator 620 which proceeds and described herein and above. Otherwise, cache matcher 660 provides an indication to long match identifier 612 that no match was found, and long match identifier 612 provides the identifiers of the entry or entries with the longest match and the pointer to the transaction record to common category processor 630, which proceeds as described herein and above.

FIG. 4A is an illustration of matrix 440, which is a representative example of a matrix such as would be used to assign a category to a transaction, as described herein and above. In this example, the tokenized transaction description is "BOBS SUPREME COURT I N MAIN", where "BOBS" is token 0, "SUPREME" is token 1, etc. The business names matched to each of these tokens are shown below each token. For example, the token "BOBS" is matched to the business names "BOBS BAKERY" and "BILLY BOBS".

As described herein and above, in one embodiment, each word in each matching business name is assigned to the entry in matrix 440 that has a column corresponding to the ordinal position of the token that matched that word (that is, the first column corresponds to the first token and the second column corresponds to the second token, and so on), and a row corresponding to the ordinal position of the first word in the business name to which any of the tokens matched (that is, the first row corresponds to first matching words in business names, the second row corresponds to second matching words in business names, and so on). For example, in the matching business name "BOBS BAKERY", the word "BOBS" would be assigned to the first column because it corresponds to the first token, and to the first row because it corresponds to the first word in the business name that matched any of the tokens. As described herein and above, in one embodiment the entry at the first column and the first row is entry (0,0). The word "BAKERY" would not be assigned to any entry because it does not match any of the tokens. Similarly, the word "BILLY" in "BILLY BOBS" would not be assigned to any entries. However, the word "BOBS" in "BILLY BOBS" would be assigned to entry (0,0).

Each entry in matrix 440 contains a formula showing how the entry score for that entry is calculated. For example, entry (0,0) contains the formula $A^0 C(I_{1 \ldots 1})$. $A^0$ is the relevance score, which as described herein and above equals the value of Alpha (e.g. 0.75) raised to the power of the row number. In this example, because 0.75 raised to the power of 0 is 1, the relevance score for entry (0,0) is 1.

C in the formula represents the category confidence score, which as described herein and above is calculated, in one embodiment, by using the categories corresponding to reverse intersecting matched business names for that entry. A reverse intersecting matched business name for the entry at row i, column j, is one of the matched business names that includes words that match each of the remaining tokens corresponding to columns j through i, inclusive. Therefore, in this example, reverse intersecting matched business names (noted as "I" in the formula) for the entry (0,0) include all matched business names with words that match the first token (noted as "1 . . . 1", or first through first, in the formula). Because both "BOBS BAKERY" and "BILLY BOBS" include words that match the first token, "BOBS", these business names are both reverse intersecting matched business names for entry (0,0). However, reverse intersecting matched business names for the entry at the first row and the sixth column, entry (0,5), would have to match all of the tokens ($I_{1 \ldots 6}$). Since none of the matching business names match all of the tokens, there are no reverse intersecting matched business names for entry (0,5).

As described herein and above, in one embodiment, the category confidence score is 1 divided by the total number of categories corresponding to all the reverse intersecting matched businesses. In this example, assume that "BOBS BAKERY" corresponds to the category "baked goods", while "BILLY BOBS" corresponds to the category "wine, beer and spirits". Therefore, in this embodiment, the category confidence score for entry (0,0) would be 1 divided by 2. Another way of expressing the same statement is: $C(I_{1 \ldots 1})=0.5$.

As described herein and above, the relevance score is multiplied by the category confidence score in order to find the entry score. Because $A^0$ is 1, and $C(I_{1 \ldots 1})$ is 0.5, for entry (0,0) the entry score is 0.5. FIG. 4B is an illustration of matrix 440, showing the entry scores for each entry. In one embodiment, once a score of 0 has been assigned to an entry in a row, all remaining entries to the right of that entry in that row can also be assigned a score 0, without calculating the resulting score for those entries. Entries that do not need to be calculated are indicated in FIG. 4B by a dash.

As described herein and above, the entry or entries with the highest entry score are identified in order to assign a category to the transaction. In this example, the entries with the highest entry score are entries (1,2) and (1,3), which each have an entry score of 0.75. The categories matching those entries are, as described herein and above, the categories associated with reverse intersecting matched business names for those entries. The reverse intersecting matched business name for entry (1,2), found by identifying the matching business name that matches both tokens 2 and 3, is "SUPREME COURT I". The reverse intersecting matched business name for entry (1,3), found by identifying the matching business name that matches tokens 2, 3, and 4, is also "SUPREME COURT I". Therefore, in this example, the category associated with the business name "SUPREME COURT I" is the category that would be assigned to the transaction.

The category thus assigned can be used to organize the transaction data. For example, using a multitude of transaction data for a user, a summary of that user's spending during a period may be displayed to a user, sorted by categories, with a sum of spending for each category and the transaction data displayed under the category name and sum. Graphs or charts, such as pie charts, may be displayed using the category sums and category names as the elements of the graphs or charts. Historical data may be displayed by category, allowing the user to view how spending on automobile maintenance has differed over time. Analysis may be performed, for example, identifying to a user that payments on a new car would be less expensive than the automobile maintenance expenditures the user has made for the past year. Advertisements may be displayed to the user based on spending or lack of spending in a category.

For many transactions, transaction data can be placed into a category without any user input.

What is claimed is:

1. A computer-implemented method of assigning a category to transaction data, comprising:
   receiving a business name in transaction data;
   receiving a categorized list of a plurality of business names, wherein each business name in the list is associated with at least one category;
   determining, by a computer, a match between the received business name and at least one word in a business name in the categorized list, which involves:
      assigning the matched word to an entry in a row of a matrix corresponding to the transaction data;
      determining importance of the row of the matrix based on a relevance of the matched word associated with the entry in the row to the received business name transaction data;
      determining a category confidence based on the number of matched words in the categorized list; and
      ranking the entry based on the importance of the row and the category confidence;
   selecting, by the computer, the category representing a businesses corresponding to the ranked entry as the category of the transaction; and
   assigning, by the computer, the selected category to the transaction data.

2. The method of claim 1, further comprising:
   receiving the transaction data which comprises a location; and
   identifying the location in the received transaction data;
   wherein the determining the match is responsive to the identified location.

3. The method of claim 2:
   wherein the location in the transaction data comprises at least one of a city and a state; and
   wherein identifying the location comprises at least one of:
      identifying the state in the transaction data; and
      identifying the city in the transaction data responsive to the state.

4. The method of claim 1, wherein the assigning the selected category to the transaction data is responsive to a location of a rightmost set of characters in the transaction data with which the correspondence of a word in the business name is determined.

5. The method of claim 1, wherein assigning the selected category to the transaction data is responsive to a manual selection.

6. The method of claim 5, wherein the manual selection corresponds to an earlier set of transaction data.

7. The method of claim 1, wherein:
   the categorized list comprises at least one hierarchy of categories; and
   assigning the selected category to the transaction data is responsive to a category in the hierarchy of categories from which at least two of the categories, for which a correspondence is determined, descend.

8. The method of claim 1, additionally comprising assigning to the transaction data other information about the business corresponding to the category.

9. A system for identifying a category corresponding to transaction data, comprising:

a transaction information receiver configured to receive a business name in transaction data;

a cities business database configured to store and provide a categorized list of a plurality of business names, wherein each business name in the list is associated with at least one category;

a business name matcher having a first input coupled to the transaction information receiver output for receiving the transaction data, and an input/output coupled to the cities/business database input/output for receiving the categorized list of business names, the business name matcher configured to determine a match between the received business name and at least one word in a business name in the categorized list and for providing at an output information related to the match, which involves:

assigning the matched word to an entry in a row of a matrix corresponding to the transaction data;

determining importance of the row of the matrix based on a relevance of the matched word associated with the entry in the row to the received business name transaction data;

determining a category confidence based on the number of matched words in the categorized list; and ranking the entry based on the importance of the row and the category confidence;

a selector configured to select the category representing a businesses corresponding to the ranked entry as the category of the transaction; and a product identifier having a first input coupled to the business name matcher for receiving the information related to the match, and an input/output coupled to the cities business database, the product identifier for configured to, for each match, assign the selected category to the transaction data.

10. The system of claim 9:

further comprising a location identifier having an input coupled to the transaction information receiver output for receiving at least a portion of the transaction data, the location identifier for identifying the location in the received transaction data and providing an indication of the location identified at an output; and wherein the business name matcher additionally comprises a location input coupled to the location identifier output, and the business name matcher determines the correspondence responsive to the location received at the business name matcher location input.

11. The system of claim 10, wherein:

the location in the transaction data comprises at least one selected from a city and a state;

the location identifier comprises at least one selected from:

a state identifier having an input coupled to the location identifier input, for receiving at least some of the at least the portion of the transaction data, the state identifier for identifying the state in the transaction data and providing an identifier of the state at an output coupled to the location identifier output, the state being a geographic entity that encompasses a plurality of cities; and a city identifier having a first input coupled to the location identifier input for receiving at least some of the at least the portion of the transaction data, and a second input coupled to the state identifier output for receiving the identifier of the state, the city identifier for identifying the city in the transaction data responsive to the state and providing at an output coupled to the location identifier output an identifier of the city.

12. The system of claim 9, wherein the category associator identifies the category of the transaction data additionally responsive to a location of a rightmost set of characters in the transaction data with which the correspondence of a word in the business name was determined.

13. The system of claim 9:

additionally comprising a manual category manager having an input coupled for receiving an identifier of a category from a user, the manual category manager for providing at an output the identifier of the category; and wherein the category associator additionally comprises a manual category input coupled to the manual category manager output for receiving the identifier of the category, and the category associator identifies the category of the transaction data additionally responsive to the identifier of the category received at the category associator manual category input.

14. The system of claim 9:

wherein the product identifier provides one identifier of the at least one category at the product identifier output responsive to the score associated with at least one highest scoring category meeting a criteria, and signals at an alternate output responsive to the score associated with at least one highest scoring category not meeting a criteria; and additionally comprising a cache matcher having a first input coupled to the product identifier alternate output for receiving the signal, and input coupled to the transaction information receiver output for receiving at least a portion of the transaction data, the cache matcher for identifying as the category of the transaction data a category previously identified for a prior transaction corresponding to the at least the portion of the transaction data received at the cache matcher input, and for providing at an output the category identified.

15. The system of claim 9, wherein:

wherein the product identifier provides one identifier of the at least one category at the product identifier output responsive to the score associated with at least one highest scoring category meeting a criteria, and provides at an alternate output a plurality of the identifiers of the at least one category, responsive to the score associated with at least one highest scoring category not meeting a criteria; and the categorized list comprises at least one hierarchy of categories; and additionally comprising a common category processor having an input coupled to the product identifier alternate output for receiving the plurality of identifiers of the at least one category, the common category processor for providing at a first output, at least one of the identifiers of the plurality of categories responsive to at least two of the plurality of identifiers of the at least one category being the same, and at least one of the plurality of identifiers of the at least one category meeting a criteria, and for providing at a second output, at least two of the identifiers of the plurality of categories responsive to at least two of the plurality of identifiers of the at least one category not being the same or at least one of the plurality of identifiers of the at least one category not meeting a criteria a hierarchy traverser, having an input coupled to the common category processor second output for receiving the at least two of the identifiers of the plurality of categories, and an input/output coupled to the cities business database, the hierarchy traverser for identifying and providing at an output an identifier of a category from which a plurality of the at least two of the identifiers of the plurality of categories descend.

16. A computer program product comprising a non-transitory computer useable medium having computer readable program code embodied therein for assigning a category to transaction data, the computer program product comprising computer readable program code devices configured to cause a computer system to:
   receive a business name in transaction data;
   receive a categorized list of a plurality of business names, wherein each business name in the list is assigned to at least one category;
   determine match between the business name of the transaction data and at least one word in each business name in the categorized list, which comprises:
      assigning the matched word to an entry in a matrix that corresponds to the transaction data;
      assigning the matched word to an entry in a row of a matrix corresponding to the transaction data;
      determining importance of the row of the matrix based on relevance of the matched word associated with the entry in the row to the received business name transaction data;
      determining a category confidence based on the number of matched words in the categorized list; and
      ranking the entry based on the importance of the row and the category confidence;
   selecting the category representing a businesses corresponding to the ranked entry as the category of the transaction; and
   assigning the selected category to the transaction data.

17. The non-transitory computer program product of claim 16, further configured to:
   receive the transaction data which comprises a location; and
   identify the location in the transaction data;
   wherein the computer readable program code devices configured to cause the computer system to determine the correspondence are responsive to the location identified.

18. The non-transitory computer program product of claim 17,
   wherein the location in the transaction data comprises at least one of a city and a state; and
   wherein the computer readable program code devices configured to cause the computer system to identify the location comprise at least one of computer readable program code devices configured to cause the computer system to:
      identify the state in the transaction data; and
      identify the city in the transaction data responsive to the state.

19. The non-transitory computer program product of claim 16, wherein the computer readable program code devices configured to cause the computer system to assign the selected category to the transaction data are responsive to a location of a rightmost set of characters in the transaction data with which the correspondence of a word in the business name is determined.

20. The non-transitory computer program product of claim 16, wherein the computer readable program code devices configured to cause the computer system to assign the selected category to the transaction data are responsive to a manual selection.

21. The non-transitory computer program product of claim 20, wherein the manual selection corresponds to an earlier set of transaction data.

22. The non-transitory computer program product of claim 16, wherein:
   the categorized list comprises at least one hierarchy of categories; and
   the computer readable program code devices configured to cause the computer system to assign the selected category to the transaction data are responsive to a category in the hierarchy of categories from which at least two of the categories, for which a correspondence is determined, descend.

23. The non-transitory computer program product of claim 16, additionally comprising computer readable program code devices configured to cause the computer system to assign to the transaction data other information about the business corresponding to the category.

* * * * *

UNITED STATES PATENT AND TRADEMARK OFFICE
CERTIFICATE OF CORRECTION

| | | |
|---|---|---|
| PATENT NO. | : 7,840,456 B2 | Page 1 of 1 |
| APPLICATION NO. | : 11/809272 | |
| DATED | : November 23, 2010 | |
| INVENTOR(S) | : Aaron Patzer | |

It is certified that error appears in the above-identified patent and that said Letters Patent is hereby corrected as shown below:

In claim 1 (at column 20, line 21), please delete the word "a" so that the line reads
--on relevance of the matched word associated with--
In claim 2 (at column 20, line 37), please delete the word "the" so that the line reads
--wherein determining the match is responsive to the--
In claim 4 (at column 20, line 46), please delete the word "the" so that the line reads
--The method of claim 1, wherein assigning the--
In claim 9 (at column 21, line 19), please delete the word "a" so that the line reads
--on relevance of the matched word associated with--

Signed and Sealed this
Eighth Day of February, 2011

David J. Kappos
*Director of the United States Patent and Trademark Office*